United States Patent
Abelovski

(10) Patent No.: US 9,163,154 B2
(45) Date of Patent: Oct. 20, 2015

(54) INKJET PRINTING FLUIDS

(71) Applicant: HEWLETT-PACKARD DEVELOPMENT COMPANY, LP, Fort Collins, CO (US)

(72) Inventor: Benjamin Abelovski, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 179 days.

(21) Appl. No.: 13/952,166

(22) Filed: Jul. 26, 2013

(65) Prior Publication Data

US 2015/0029273 A1 Jan. 29, 2015

(51) Int. Cl.
| | |
|---|---|
| *B41J 2/01* | (2006.01) |
| *C09D 11/38* | (2014.01) |
| *C09D 11/107* | (2014.01) |
| *C09D 11/322* | (2014.01) |
| *C09D 11/033* | (2014.01) |
| *B41J 2/21* | (2006.01) |

(52) U.S. Cl.
CPC ............... *C09D 11/38* (2013.01); *B41J 2/2107* (2013.01); *C09D 11/033* (2013.01); *C09D 11/107* (2013.01); *C09D 11/322* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC ................. 347/100, 95, 96, 88, 99, 103, 101; 106/31.6, 31.27, 31.13; 523/161, 160
See application file for complete search history.

(56) References Cited

U.S. PATENT DOCUMENTS

| | | | |
|---|---|---|---|
| 6,048,390 A | 4/2000 | Yano et al. | |
| 7,638,561 B2 | 12/2009 | Fu et al. | |
| 8,362,102 B2 | 1/2013 | Jeremic et al. | |
| 2005/0282930 A1* | 12/2005 | Fu et al. | 523/160 |
| 2007/0131144 A1* | 6/2007 | Winter et al. | 106/31.66 |
| 2007/0171266 A1* | 7/2007 | Kluge et al. | 347/100 |
| 2009/0095202 A1* | 4/2009 | Fechner et al. | 106/31.86 |
| 2009/0221736 A1* | 9/2009 | McCurry | 524/451 |
| 2010/0166975 A1* | 7/2010 | Abergel | 427/511 |
| 2011/0036257 A1 | 2/2011 | Lawrence | |
| 2011/0193911 A1 | 8/2011 | Bisson et al. | |

FOREIGN PATENT DOCUMENTS

WO    WO-2009034394 A1    3/2009

\* cited by examiner

*Primary Examiner* — Manish S Shah
(74) *Attorney, Agent, or Firm* — HP Legal Dept.

(57) ABSTRACT

Examples provide inkjet printing fluid compositions and apparatuses including such compositions. An inkjet printing fluid composition may comprise a vehicle including at least 50% weight percent water based on the inkjet printing fluid composition as a whole and substantially only one surfactant, the surfactant including alkoxylated alcohol present in the inkjet printing fluid composition from about 0.1 weight percent to about 1.0 weight percent alkoxylated alcohol.

12 Claims, No Drawings

INKJET PRINTING FLUIDS

BACKGROUND

Inkjet printing has become a popular way of recording images on various media surfaces, particularly paper and photo media substrates. Inkjet printers commonly use water-based inkjet inks, which generally include water-soluble or water-dispersible components. The inkjet printers typically operate by dispensing ink droplets via a printhead nozzle of a printer pen onto a surface of a print medium as the print medium is conveyed past a print head of an inkjet printer.

DETAILED DESCRIPTION

As a preliminary matter, it should be noted that in this description, various aspects of the illustrative implementations are described using terms commonly employed by those skilled in the art to convey the substance of their work to others skilled in the art. It will be apparent to those skilled in the art that alternate implementations may be practiced with only some of the described aspects. For purposes of explanation, specific numbers, materials, and configurations are set forth in order to provide a thorough understanding of the illustrative implementations. It will be apparent to one skilled in the art that alternate implementations may be practiced without the specific details. In other instances, well-known features may be omitted or simplified in order not to obscure the illustrative implementations.

It should also be noted that the phrases "in various implementations," "in some implementations," and the like, are used repeatedly. The phrases generally do not refer to the same implementations: however, they may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

Furthermore, concentrations, amounts, and other numerical data may be presented in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of "about 1 wt % to about 20 wt %" should be interpreted to include not only the explicitly recited values of about 1 wt % to about 5 wt %, but also include individual values 2 wt %, 3 wt %, and 4 wt %, and sub-ranges such as 5 wt % to 15 wt %, 10 wt % to 20 wt %, etc.

In addition, the inkjet printing fluid compositions and apparatuses including such compositions described herein may be described with particular examples from non-exhaustive lists. Any combinations of material in various amounts that perform the functions described herein, however, may be within the scope of the principles described herein, unless indicated otherwise.

To provide a backdrop for the present disclosure, it is noted that some inkjet printing fluids have been known to include latex or polyurethane stabilzers or additives such as water-soluble polymers or other high-molecular weight additives in an effort to achieve increase drop weight, drop velocity, kogation, and stability performance. Moreover, efforts have been made to increase the reliability of printing fluids with the addition of an alkoxylated alkyl phosphate ester anti-kogation surfactant such as, for example, polyoxyethylene (3) oleyl alcohol phosphate (such as, e.g., CRODAFOS™ N3 Acid, available from Croda Inc., Edison, N.J., (U.S.A).

Described herein are various implementations of aqueous inkjet printing fluids incorporating a vehicle including a silicone-free alkozylated alcohol surfactant as an anti-kogation agent to provide inkjet printing fluids with increased drop weight, drop velocity, kogation, and stability performance as compared to the comparison printing fluids. In various implementations, the printing fluids may be devoid of other anti-kogation agents such as, for example, alkoxylated alkyl phosphate ester surfactant, silicones, latexes, polymeric binders, fixing compounds, and polyurethanes.

The printing fluids described herein may include the silicone-free alkoxylated alcohol surfactant in an amount from about 0.1 weight percent (wt %) to about 1.0 wt %. In various ones of these implementations, the printing fluid may include substantially only one surfactant, and may include no more that about 1.0 wt % of the substantially only one surfactant in total. In other implementations, a printing fluid may include silicone-free alkoxylated alcohol surfactant in an amount of at least about 0.3 wt %. In some of these implementations, the silicone-free alkoxylated alcohol surfactant may be present in the printing fluid in an amount from about 0.3 wt % to about 0.4 wt %. In various ones of these implementation, the printing fluid may include substantially only one surfactant, and may include no more than about 0.4 wt % of the substantially only one surfactant in total.

In various implementations in which the printing fluid includes the silicone-free alkoxylated alcohol surfactant in an amount from about 0.1 weight percent to about 1.0 wt %, the printing fluid may include substantially only one surfactant and may include no more than about 1.0 wt % of the substantially only one surfactant in total. In various implementations in which the printing fluid includes the silicone-free alkoxylated alcohol surfactant in an amount from about 0.3 wt % to about 0.4 wt %, the printing fluid may include substantially only one surfactant and include no more that about 0.4 wt % of the substantially only one surfactant in total. That being stated, in some examples, other surfactants may be present in the printing fluids, and in at least some of these examples in which the printing fluid includes substantially only one surfactant, the printing fluid may include predominantly the silicone-free alkoxylated alcohol surfactant, with other surfactant(s) present in the printing fluid at less that 0.5 wt %, less than 0.1 wt %, or even less than 0.05 wt %.

In various implementations, an example silicone-free alkoxylated alcohol surfactant may include TEGO® Wet 510 (Evonik Tego Chemie GmbH). As used herein, "silicone" may include, for example, silica, silanes, silazanes, siloxanes, and organosiloxanes, among others, and may refer to a compound comprising at least one silicon.

It has been recognized that anti-kogation agents such as alkoxylated alkyl phosphate ester surfactants may tend to chelate metals in a printing fluid to form complexes that may not be water-soluble. The complexes may precipitate and clog nozzles, pen filters, and damage pen resistors. In some cases, alkoxylated alkyl phosphate ester surfactant may inhibit pigment dispersion stability due at least in part to the tendency of alkoxylated alkyl phosphate ester surfactant to strip pigment dispersants (such as, e.g., styrene-acrylate-type dispersants) from pigment surfaces. In further cases, alkoxylated alkyl phosphate ester surfactant may not be compatible with other anti-kogation agents. As such, the printing fluids described herein may be devoid of alkoxylated alkyl phosphate ester surfactants. In various examples in which the printing fluid includes substantially only one surfactant, the printing fluid may include the silicone-free alkoxylated alcohol surfactant, and in some of these examples, may also include one or more other surfactants, but in both of these examples, the printing fluids may be devoid of alkoxylated alkyl phosphate ester surfactant.

A notable example of alkoxylated alkyl phosphate ester surfactants includes polyoxyethylene (3) oleyl alcohol phosphate (such as, e.g., CRODAFOS™ N3 Acid, available from Croda Inc., Edison N.J., U.S.A). Other examples of alkoxylated alkyl phosphate ester surfactants may include, but is not limited to, DEXTROL™ and STRODEX™ (available from Ashland Inc., Covington, Ky., U.S.A), and the TRITON™ phosphate ester series (such as, e.g., TRITON™ H-55, TRITON™ H-66, TRITON™ QS-44, and TRITON™ XQS-20, available from Dow Chemical Co., Midland, Mich., U.S.A).

While the present inkjet printing fluids may include additives, in various examples, the inkjet printing fluids may exclude other anti-kogation agents such as, but not limited to, silicones, latexes, polymeric binders, fixing compounds, polyurethanes, and mixtures thereof. In fact, in one example, all of these types of anti-kogation agents may be omitted from the inkjet printing fluid formulation. In another example, the present inkjet printing fluids may be devoid of latex or polyurethane stabilizers or additives such as water-soluble polymers or other high-molecular weight additives. It has been recognized that these stabilizers may tend to increase the risk of ink decap problems due to cross-linking or due to high-molecular weight latex/polyurethane material clogging the pen nozzles. Latexes or polyurethanes may also present a reliability risk as they can precipitate onto the pen resistors and cause resistor failures, especially over longer periods of pen firing. Soluble polymers may raise the viscosity of inks, which may make inks more difficult to jet effectively or contribute to decap problems. That being stated, in some examples, these types of anti-kogation agents may be present in the inkjet printing fluids in low amounts, including less than 0.5 wt %, less than 0.1 wt %, or even less than 0.05 wt %.

Regarding kogation performance, kogation of the inkjet printing fluids described herein may be measured through a variety of printing characteristics, such as drop weight, drop velocity, and decap. In one example, after 1 billion drops per nozzle (BDPN), the present inkjet printing fluids can maintain a drop weight within 20 wt % of the initial drop per nozzle. In other examples, the present inkjet printing fluids can maintain a drop weight within 20 wt % of initial drop per nozzle after 200 million drops per nozzle (MDPN). In yet other examples, the present inkjet printing fluids can maintain a drop weight within 5 wt % of initial drop per nozzle after 200 MDPN. Additionally, in an example, the present inkjet printing fluids can maintain a drop velocity within 20 wt % of the initial drop per nozzle after 1 BDPN. In other examples, the present inkjet printing fluids can maintain a drop velocity within 15% of the initial drop per nozzle, after 200 MDPN. In yet other examples, the present inkjet printing fluids can maintain a drop velocity within 10% of the initial drop per nozzle, after 200 MDPN.

In addition, the present inkjet printing fluids may have a 7 second decap of 2 or less, and in one aspect, a 7 second decap of 1 or less.

Further, in an example, the present inkjet printing fluids exhibit a particle size percent change of 6 percent or less when tested for stability under two types of stress tests: an accelerated shelf-life (ASL) test and a temperature-cycling (T-cycle) test. In an example under the latter test, the present inkjet printing fluids exhibit a particle size percent change of 2 percent or less.

Additionally, the present inkjet printing fluids may have superior drop velocity and drop weight compared to comparable inkjet printing fluids when fired from the same printer at the same printing settings. Drop velocity and drop weight improvements, for example, can be measured by comparing the present inkjet alkoxylated alcohol surfactant and exclude alkoxylated alkyl phosphate ester surfactant, but that is otherwise identical (water used to replace the missing any small concentration of the silicone-free alkoxylated alcohol surfactant). In one example, the present inkjet printing fluids can have at least a 5 wt % increased drop weight. In one aspect, the present inkjet printing fluids can have at least a 20 wt % increased drop weight, and in specific aspect, at least a 30 wt % increased drop weight. In one example, the present inkjet printing fluids can have at least a 15% increased drop velocity. In some aspects, the present inkjet printing fluids can have at least a 40% increased drop velocity, at least a 70% increased drop velocity, and in specific aspect, at least a 100% increased drop velocity.

Various implementations of the printing fluids may include a colorant. Generally, any colorant may be used in the present printing fluids and the colorant may or may not impart color to the printing fluid. The colorant may be a pigment, and in at least some of these implementations, the colorant may comprise a dispersant-stabilized pigment. In other implementations, the colorant may be a dye or a dye/pigment mix. As used herein, "dye" may refer to compounds or molecules that impart color to an ink. As such, dye includes molecules and compounds that absorb electromagnetic radiation or certain wavelengths thereof. For example, dyes may include those that fluoresce and those that absorb certain wavelengths of visible light. Generally, dyes may be water soluble. Furthermore, as used herein, "pigment" may generally include pigment colorants, magnetic particles, aluminas, silicas, and/or other ceramics, organo-metallics, metallic particulates, or other opaque particles.

Various implementations of printing fluids including a pigment colorant may also include a pigment dispersant. In various implementations, the dispersant may be a styrene-acrylate-type dispersant such as, but not limited to, acrylic polymers having hydrophilic monomers including acid monomers, and hydrophobic monomers. In some examples, a printing fluid may include styrene-acrylate-type dispersant present in the printing composition in amount of about 0.1 wt % to about 5 wt %. Hydrophobic monomers that can be polymerized in the acrylic dispersant may include, but are not limited to, styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, ethoxylated nonyl phenol methacrylate, isobornyl methacrylate, cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, combinations thereof, derivatives thereof, and mixtures thereof.

The printing fluids described herein may be an aqueous printing fluid. To that end, the vehicle formulations described herein may include water. In various implementations, the printing fluid includes water in an amount of at least about 50 wt % or the printing fluid composition as a whole. In other implementations, the printing fluid includes water in an amount of at least about 80 wt % or the printing fluid composition as a whole.

The printing fluids described herein may include at least one co-solvent. In various implementations, a printing fluid may include co-solvent or co-solvents present in total at from 0.1 wt % to 30 wt %, depending on the jetting architecture, though amounts outside of this range may also be used. In various implementations, a printing fluid may include at least one organic co-solvent is present in the inkjet printing fluid composition in an amount up to about 15 wt %. In other implementations, a printing fluid may include at least one organic co-solvent present in the inkjet printing fluid composition in an amount from about 5.0 wt % and about 9.0 wt %.

In many implementations, the printing fluids include at least one organic co-solvent such as, for example, comprises 2-pyrrolidinones, a homolog of 2-pyrrolidone, a glycol, or a combination thereof. Example classes of co-solvents that may be used can include organic co-solvents including aliphatic alcohols, aromatic alcohols, diols, glycol ethers, polyglycol ethers, 2-pyrrolidinones, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs (C6-C12) of polyethylene glycol alkyl ethers. N-alkyl caprolactams, unsubstituted caprolactams, both substituted and unsubstituted formamides, both substituted and unsubstituted acetamides, and the like.

Further, non-ionic, cationic, and/or anionic surfactants may be present, ranging from 0.01 wt %. In addition to the colorant, the balance of the formulation can be purified water, or other vehicle components known in the art, such as biocides, viscosity modifiers, materials for pH adjustment, sequestering agents, preservatives, and the like. In some implementations, the vehicle can be predominantly water and can be referred to as an aqueous liquid vehicle.

Generally, the present inkjet printing fluids may contain a colorant and a vehicle. As used herein, "vehicle" or "ink vehicle" may refer to the liquid fluid in which a colorant is placed to form a printing fluid such as ink. In one example, the vehicle can also include a colorant. Such vehicles may include a mixture of a variety of different agents, including, solvents, co-solvents, buffers, biocides, sequestering agents, viscosity modifiers, water, etc. In one aspect, water can comprise a majority of the liquid vehicle.

The inkjet printing fluid compositions of the present disclosure may be suitable for use on many types of substrates of recording media, including but not limited, plain paper, gloss media, porous media, non-porous media, etc.

Consistent with the formulations of this disclosure, various other additives may be employed to enhance the properties of the printing fluid composition for specific applications. Examples of these additives may include those added to inhibit the growth of harmful microorganisms. These additives may be biocides, fungicides, and other microbial agents, which are routinely used in ink formulations. Examples of suitable microbial agents include, but are not limited to, KORDEK™ MLX (Dow Chemical Co.), NUOSEPT® (Ashland Inc.) UCARCIDE™ (Dow Chemical Co.), and PROXEL® (Arch Chemicals), and combinations thereof. In various implementations, a printing fluid may include at least one biocide having a total presence in an amount from about 0.01 wt % and about 0.5 wt %.

Sequestering agents, such as EDTA (ethylene diamine tetra acetic acid), may be included to eliminate the deleterious effects of heavy metal impurities, and buffer solutions may be used to control the pH of the printing fluid. a printing fluid may include from 0 wt % to 2 wt %, for example, of sequestering agent(s) and/or buffer solution. Viscosity modifiers and buffers may also be present, as well as other additives known to those skilled in the art to modify properties of the printing fluid as desired. Such additives may be present at from 0 wt % to 20 wt %.

The printing fluids described herein may be incorporated into various apparatuses or systems for inkjet printing. In some implementations, an apparatus such as a printer, for example, may include a printing fluid composition including silicone-free alkoxylated alcohol surfactant and devoid of alkoxylated alkyl phosphate ester surfactant, the printer adapted to print the printing fluid. The printing fluid may include at least 50% wt % water based on the printing fluid composition as a whole and from about 0.1 wt % to about 1.0 weight of the silicone-free alkoxylated alcohol surfactant. Various other implementations may be possible within the scope of the present disclosure.

EXAMPLES

The following are illustrative examples of inkjet printing fluids within the scope of the present disclosure. It is to be understood that experimental data provided does not limit the scope of the embodiments. Rather, the data merely illustrate the preparation of composition embodiments in accordance with the subject disclosure as well as for demonstrating the properties described above illustrating the usefulness of the inkjet printing fluid compositions.

Example 1

Cyan Inkjet Printing Fluids

Two cyan inkjet printing fluids and two comparison cyan inkjet printing fluids were prepared by admixing the Compositional Components at the concentrations listed in TABLE 1.

TABLE 1

| Compositional Components | Comparative Cyan 1 (wt %) | Cyan 1 (wt %) | Comparative Cyan 2 (wt %) | Cyan 2 (wt %) |
|---|---|---|---|---|
| 2-pyrrolidone | 8.91 | 8.91 | | |
| 1-(2-hydroxyethyl)-2-pyrrolidone | | | 5.88 | 5.88 |
| TEGO ® Wet 510 | 0.35 | 0.35 | | 0.35 |
| SURFYNOL ® SE-F | | | 0.70 | |
| CRODAFOS ™ N3 Acid | 0.50 | | 0.50 | |
| PROXEL ™ GXL | 0.10 | 0.10 | 0.10 | 0.10 |
| KORDEK ™ MLX | 0.14 | 0.14 | 0.14 | 0.14 |
| Pigment | 2.50 | 2.50 | 2.50 | 2.50 |
| Water | Balance | Balance | Balance | Balance |

Example 2

Drop Weight and Drop Velocity Data (Cyan Inkjet Printing Fluids)

The Cyan 1 and Cyan 2 inkjet printing fluids and Comparative Cyan 1 and Comparative Cyan 2 inkjet printing fluids of Example 1 were tested for drop weight and drop velocity under the same printing conditions at various intervals as listed in TABLE 2 and TABLE 3.

TABLE 2

| | Drop Weight (ng) | | | |
|---|---|---|---|---|
| MDPN* | Comparative Cyan 1 | Cyan 1 | Comparative Cyan 2 | Cyan 2 |
| 0 | 4.54 | 5.04 | 4.67 | 4.59 |
| 1 | 4.44 | 5.00 | 4.75 | 4.57 |
| 10 | 4.57 | 5.01 | 4.94 | 4.68 |
| 50 | 4.15 | 4.97 | 4.08 | 4.75 |
| 100 | 3.56 | 4.62 | 3.96 | 4.26 |
| 200 | 3.34 | 4.23 | 3.65 | 3.91 |
| % diff** | −26.46 | −16.07 | −22 | −15 |

*MDPN is million drops per nozzle
**% diff is between initial (0) and 200 MDPN

TABLE 3

| | Drop Velocity (m/s) | | | |
|---|---|---|---|---|
| MDPN* | Comparative Cyan 1 | Cyan 1 | Comparative Cyan 2 | Cyan 2 |
| 0 | 6.33 | 8.75 | 6.74 | 7.90 |
| 1 | 6.33 | 8.99 | 7.04 | 8.20 |
| 10 | 6.76 | 9.66 | 5.17 | 9.45 |
| 50 | 5.76 | 9.20 | 8.20 | 8.48 |
| 100 | 4.22 | 7.47 | 4.63 | 7.97 |
| 200 | 4.39 | 8.95 | 5.08 | 8.67 |
| % diff** | −30.65 | +2.29 | −25 | +10 |

*MDPN is million drops per nozzle
**% diff is between initial (0) and 200 MDPN

Example 3

Decap Performance (Cyan Inkjet Printing Fluids)

The Cyan 2 and Comparative Cyan 2 inkjet printing fluids of Example 1 were tested against each other, and each was measured for decap. The decap was measured as the number of spits to print a normal drop after leaving the printing nozzle uncovered for 7 seconds. The results are listed in TABLE 4.

TABLE 4

| Ink | Decap (# spits) |
|---|---|
| Comparative Cyan 2 | 1 |
| Cyan 2 | 2 |

Example 4

Magenta Inkjet Printing Fluids

Two magenta inkjet printing fluids and two comparison magenta inkjet printing fluids were prepared by admixing the Compositional Components at the concentrations listed in TABLE 5.

TABLE 5

| Compositional Components | Comparative Magenta 1 (wt %) | Magenta 1 (wt %) | Comparative Magenta 2 (wt %) | Magenta 2 (wt %) |
|---|---|---|---|---|
| 2-pyrrolidone | 8.91 | 8.91 | | |
| 1-(2-hydroxyethyl)-2-pyrrolidone | | | 5.88 | 5.88 |
| TEGO ® Wet 510 | 0.35 | 0.35 | | 0.35 |
| SURFYNOL ® SE-F Surfactant (Air Products and Chemicals, Inc.) | | | 0.70 | |
| CRODAFOS ™ N3 Acid | 0.50 | | 0.50 | |
| PROXEL ™ GXL | 0.10 | 0.10 | 0.10 | 0.10 |
| KORDEK ™ MLX | 0.14 | 0.14 | 0.14 | 0.14 |
| Pigment | 3.50 | 3.50 | 3.50 | 3.50 |
| Water | Balance | Balance | Balance | Balance |

Example 5

Drop Weight and Drop Velocity Data (Magenta Inkjet Printing Fluids)

The magenta 1 and Magenta 2 inkjet printing fluids and Comparative Magenta 1 and Comparative Magenta 2 inkjet printing fluids of Example 4 were tested for drop weight and drop velocity under the same printing conditions at various intervals as listed in TABLE 6 and TABLE 7.

TABLE 6

| | Drop Weight (ng) | | | |
|---|---|---|---|---|
| MDPN* | Comparative Magenta 1 | Magenta 1 | Comparative Magenta 2 | Magenta 2 |
| 0 | 5.14 | 5.68 | 5.21 | 5.67 |
| 1 | 5.34 | 5.63 | 5.28 | 5.76 |
| 10 | 5.36 | 5.72 | 5.27 | 5.68 |
| 50 | 5.33 | 5.80 | 5.20 | 5.67 |
| 100 | 5.39 | 5.53 | 5.01 | 5.76 |
| 200 | 4.99 | 5.44 | 4.70 | 5.60 |
| % diff** | −2.92 | −4.23 | −12 | −1 |

*MDPN is million drops per nozzle
**% diff is between initial (0) and 200 MDPN

TABLE 7

| | Drop Velocity (m/s) | | | |
|---|---|---|---|---|
| MDPN* | Comparative Magenta 1 | Magenta 1 | Comparative Magenta 2 | Magenta 2 |
| 0 | 9.11 | 10.63 | 9.90 | 10.46 |
| 1 | 9.02 | 10.83 | 9.96 | 10.71 |
| 10 | 9.55 | 11.02 | 8.84 | 10.69 |
| 50 | 9.26 | 11.31 | 10.11 | 11.21 |
| 100 | 8.95 | 11.08 | 9.59 | 11.00 |
| 200 | 8.07 | 9.38 | 8.05 | 11.16 |
| % diff** | −11.42 | −11.76 | −17 | +7 |

*MDPN is million drops per nozzle
**% diff is between initial (0) and 200 MDPN

Example 6

Drop Weight and Drop Velocity Data (Magenta 2/Comparative Magenta 2)

The Magenta 2 and Comparative Magenta 2 inkjet printing fluids of Example 4 were tested for drop weight and drop velocity under the same printing conditions at various intervals as listed in TABLE 8 and TABLE 9.

TABLE 8

| | Drop Weight (ng) | |
|---|---|---|
| MDPN* | Comparative Magenta 2 | Magenta 2 |
| 0 | 5.28 | 5.96 |
| 1 | 5.59 | 5.92 |
| 50 | 5.43 | 5.99 |
| 350 | 4.92 | 5.78 |
| 700 | 4.02 | 4.99 |
| 1000 | 3.69 | 4.80 |
| % diff** | −30 | −19 |

*MDPN is million drops per nozzle
**% diff is between initial (0) and 1000 MDPN

TABLE 9

| | Drop Velocity (m/s) | |
|---|---|---|
| MDPN* | Comparative Magenta 2 | Magenta 2 |
| 0 | 9.44 | 10.63 |
| 1 | 9.56 | 10.80 |
| 50 | 9.51 | 11.13 |
| 350 | 7.97 | 10.26 |
| 700 | 5.64 | 9.32 |
| 1000 | 4.90 | 9.03 |
| % diff** | −48 | −15 |

*MDPN is million drops per nozzle
**% diff is between initial (0) and 1000 MDPN

Example 7

Decap Performance (Magenta 2/Comparative Magenta 2)

The Magenta 2 and Comparative Magenta 2 inkjet printing fluids of Example 4 were tested against each other, and each was measured for decap at 200 MDPN and also at 1000 MDPN. The decap was measured as the number of spits to print a normal drop after leaving the printing nozzle uncovered for 7 seconds. The results are listed in TABLE 10.

TABLE 10

| Printing Fluid | MDPN | Decap (# spits) |
|---|---|---|
| Comparative Magenta 2 | 200 | 2 |
| Magenta 2 | 200 | 1 |
| Comparative Magenta 2 | 1000 | 2 |
| Magenta 2 | 1000 | 2 |

Example 8

Particle Performance (Magenta 2/Comparative Magenta 2)

The Magenta 2 and Comparative Magenta 2 inkjet printing fluids of Example 5 were tested for stability under two types of stress tests: an accelerated shelf-life (ASL) test and a temperature-cycling (T-cycle) test. The stress tests subjected the printing fluids to both heating and freezing stresses. The results are listed in TABLE 11.

TABLE 11

| Printing Fluid | Particle size % change after 2-week, 60-cycle ASL test | Particle size % change after T-cycle test |
|---|---|---|
| Comparative Magenta 2 | 104 | 153 |
| Magenta 2 | −6 | 4 |

As shown in TABLES 8-10, the Magenta 2 inkjet printing fluid, with TEGO® Wet 510 and devoid of CRODAFOS™ N3 Acid, exhibited better kogation performance than the Comparative Magenta 2 inkjet printing fluid, with CRODAFOS™ N3 Acid and devoid of TEGO® Wet 510. The percent change in drop weight and drop velocity over 1000 MDPN was consistantly lower (i.e., better) for the Magenta 2 inkjet printing fluid as compared to the Comparative Magenta 2.

In addition, as shown in TABLE 11, the Magenta 2 printing fluid exhibited much less particles size percent change (i.e., better) as compared to the Comparative Magenta 2 printing fluid, indicative that the Magenta 2 printing fluid is quantitatively more stable that the Comparative Magenta 2 printing fluid.

Example 9

Red Inkjet Printing Fluids

Two red inkjet printing fluids and two comparison red inkjet printing fluids were prepared by admixing the Compositional Components at the concentrations listed in TABLE 12.

TABLE 12

| Compositional Components | Comparative Red 1 (wt %) | Red 1 (wt %) |
|---|---|---|
| 2-pyrrolidone | 8.91 | 8.91 |
| 1-(2-hydroxyethyl)-2-pyrrolidone | | |
| TEGO ® Wet 510 | 0.35 | 0.35 |
| SURFYNOL ® SE-F Surfactant (Air Products and Chemicals, Inc.) | | |
| CRODAFOS ™ N3 Acid | 0.50 | |
| PROXEL ™ GXL | 0.10 | 0.10 |
| KORDEK ™ MLX | 0.14 | 0.14 |
| Pigment | 3.00 | 3.00 |
| Water | Balance | Balance |

Example 10

Drop Weight and Drop Velocity Data (Red Inkjet Printing Fluids)

The red inkjet printing fluid and comparative red inkjet printing fluid of Example 8 were tested for drop weight and drop velocity under the same printing conditions at various intervals as listed in TABLE 13 and TABLE 14.

TABLE 13

| | Drop Weight (ng) | |
|---|---|---|
| MDPN* | Comparative Red 1 | Red 1 |
| 0 | 4.94 | 5.30 |
| 1 | 4.59 | 5.20 |

TABLE 13-continued

| | Drop Weight (ng) | |
|---|---|---|
| MDPN* | Comparative Red 1 | Red 1 |
| 10 | 4.97 | 5.37 |
| 50 | 5.10 | 5.49 |
| 100 | 4.78 | 5.53 |
| 200 | 4.55 | 5.52 |
| % diff** | −7.89 | +4.15 |

*MDPN is million drops per nozzle
**% diff is between initial (0) and 200 MDPN

TABLE 14

| | Drop Velocity (m/s) | |
|---|---|---|
| MDPN* | Comparative Red 1 | Red 1 |
| 0 | 8.84 | 9.44 |
| 1 | 8.98 | 9.69 |
| 10 | 9.16 | 10.23 |
| 50 | 9.37 | 10.69 |
| 100 | 8.45 | 10.63 |
| 200 | 7.43 | 10.72 |
| % diff** | −15.95 | +13.56 |

*MDPN is million drops per nozzle
**% diff is between initial (0) and 200 MDPN

Although certain implementations have been illustrated and described herein, it will be appreciated by those of ordinary skill in the art that a wide variety of alternate and/or equivalent implementations calculated to achieve the same purposes may be substituted for the implementations shown and described without departing from the scope of this disclosure. Those with skill in the art will readily appreciate that implementations may be implemented in a wide variety of ways. This application is intended to cover any adaptations or variations of the implementations discussed herein. It is manifestly intended, therefore, that implementations be limited only by the claims and the equivalents thereof.

What is claimed is:

1. An inkjet printing fluid composition comprising:
a colorant; and
a vehicle including at least 80 weight percent water based on the inkjet printing fluid composition as a whole, at least one organic co-solvent present in the inkjet printing fluid composition in an amount up to about 15 weight percent, and substantially only one surfactant, the surfactant including alkoxylated alcohol present in the inkjet printing fluid composition from about 0.1 weight percent to about 0.4 weight percent alkoxylated alcohol.

2. The inkjet printing fluid composition of claim 1, wherein the colorant is a pigment.

3. The inkjet printing fluid composition of claim 2, wherein the pigment is a dispersant-stabilized pigment, and wherein the inkjet printing fluid composition comprises a styrene acrylate pigment dispersant.

4. The inkjet printing fluid composition of claim 1, the alkoxylated alcohol is present in the inkjet printing fluid composition in an amount of at least about 0.3 weight percent to about 0.4 weight percent.

5. The inkjet printing fluid composition of claim 1, wherein the at least one organic co-solvent comprises 2-pyrrolidone, a homolog of 2-pyrrolidone, a glycol, or a combination thereof.

6. The inkjet printing fluid composition of claim 1, wherein the at least one organic solvent is present in the inkjet printing fluid composition in an amount from about 5.0 weight percent and about 9.0 weight percent.

7. The inkjet printing fluid composition of claim 1, the alkoxylated alcohol is present in the inkjet printing fluid composition in an amount from about 0.3 weight percent to about 0.4 weight percent, and the vehicle includes no more than about 0.4 weight percent of the substantially only one surfactant in total.

8. The inkjet printing fluid composition of claim 1, wherein the substantially only one surfactant consists of the alkoxylated alcohol.

9. The inkjet printing fluid composition of claim 1, further comprising at least one biocide, wherein the at least one biocide is present in an amount from about 0.01 weight percent and about 0.5 weight percent.

10. An apparatus comprising:
an inkjet printer cartridge including a printing fluid composition comprising at least 80% weight percent water based on the printing fluid composition as a whole, at least one organic co-solvent present in the printing fluid composition in an amount up to about 15 weight percent, and substantially only one surfactant, the surfactant including alkoxylated alcohol present in the printing fluid composition from about 0.1 weight percent to about 0.4 weight alkoxylated alcohol.

11. The apparatus of claim 10, wherein the printing fluid composition further comprises a dispersant-stabilized pigment, and wherein the printing fluid composition comprises a styrene acrylate pigment dispersant.

12. The apparatus of claim 10, wherein the alkoxylated alcohol is present in the printing fluid composition in an amount from about 0.3 weight percent to about 0.4 weight percent, and wherein the printing fluid composition includes no more than about 0.4 weight percent of the substantially only one surfactant in total.

* * * * *

UNITED STATES PATENT AND TRADEMARK OFFICE
CERTIFICATE OF CORRECTION

Page 1 of 1

PATENT NO. : 9,163,154 B2
APPLICATION NO. : 13/952166
DATED : October 20, 2015
INVENTOR(S) : Benjamin Abelovski It is certified that error appears in the above-identified patent and that said Letters Patent is hereby corrected as shown below:

IN THE CLAIMS

In column 12, line 9, in Claim 4, delete "of at least" and insert -- about --, therefor.

In column 12, line 40, in Claim 10, delete "weight alkoxylated" and insert -- weight percent alkoxylated --, therefor.

Signed and Sealed this
Fifth Day of April, 2016

Michelle K. Lee
*Director of the United States Patent and Trademark Office*